United States Patent [19]

Searle

[11] 4,036,052
[45] July 19, 1977

[54] ELECTROMAGNETIC FLOWMETER USABLE IN LESS-THAN-FULL FLUID LINES

[75] Inventor: John L. Searle, Richboro, Pa.

[73] Assignee: Fischer & Porter Co., Warminster, Pa.

[21] Appl. No.: 710,118

[22] Filed: July 30, 1976

[51] Int. Cl.² .............................................. G01F 1/58
[52] U.S. Cl. .............................................. 73/194 EM
[58] Field of Search .................................. 73/194 EM

[56] References Cited

U.S. PATENT DOCUMENTS

| 3,479,871 | 11/1969 | Cushing | 73/194 EM |
| 3,757,576 | 9/1973 | Rolff et al. | 73/194 EM |
| 3,783,687 | 1/1974 | Mannherz et al. | 73/194 EM |

FOREIGN PATENT DOCUMENTS

| 1,548,949 | 6/1970 | Germany | 73/194 EM |
| 1,291,523 | 3/1969 | Germany | 73/194 EM |

Primary Examiner—Charles A. Ruehl

[57] ABSTRACT

An electromagnetic flowmeter having a flow tube interposed in a normally less-than-full fluid line. A pair of arcuate electrodes are mounted in the flow tube at opposed positions spanning a substantial portion of the total circumference of the inner wall of the tube, whereby the electrodes are operative with respect to fluid in the tube in a range extending from a level close to empty to completely full. The electrodes which are in direct contact with the fluid have an inverted T formation, whose vertical leg conforms to the inner circumference of the tube, and whose horizontal base extends along the bottom of the tube, thereby maintaining a large portion of the electrode area in contact with the fluid at all times. Associated with the flow tube is an electromagnet that is excited by a periodically interrupted direct current to establish a magnetic field in the tube which is intercepted by the fluid passing therethrough to induce a signal in the electrodes.

7 Claims, 3 Drawing Figures

U.S. Patent
July 19, 1977
4,036,052
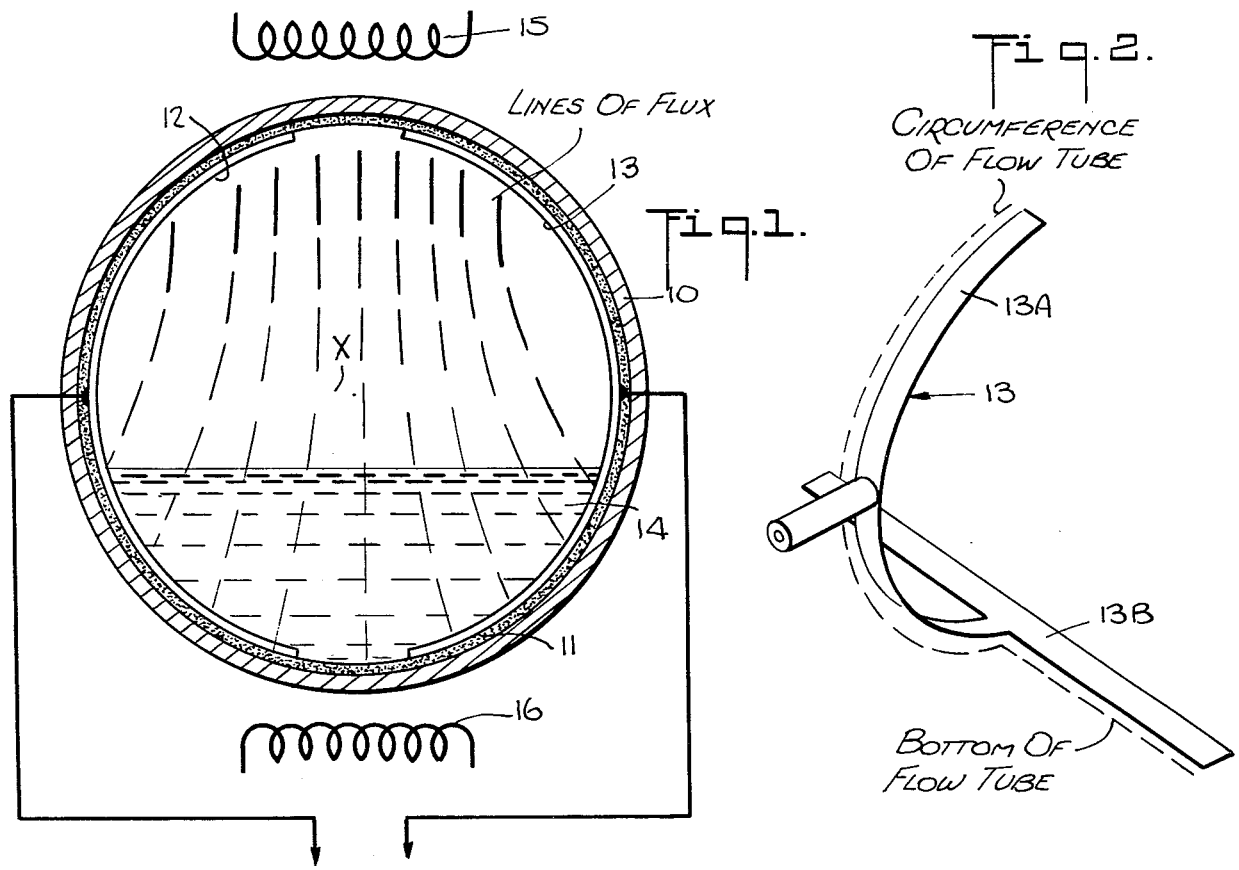
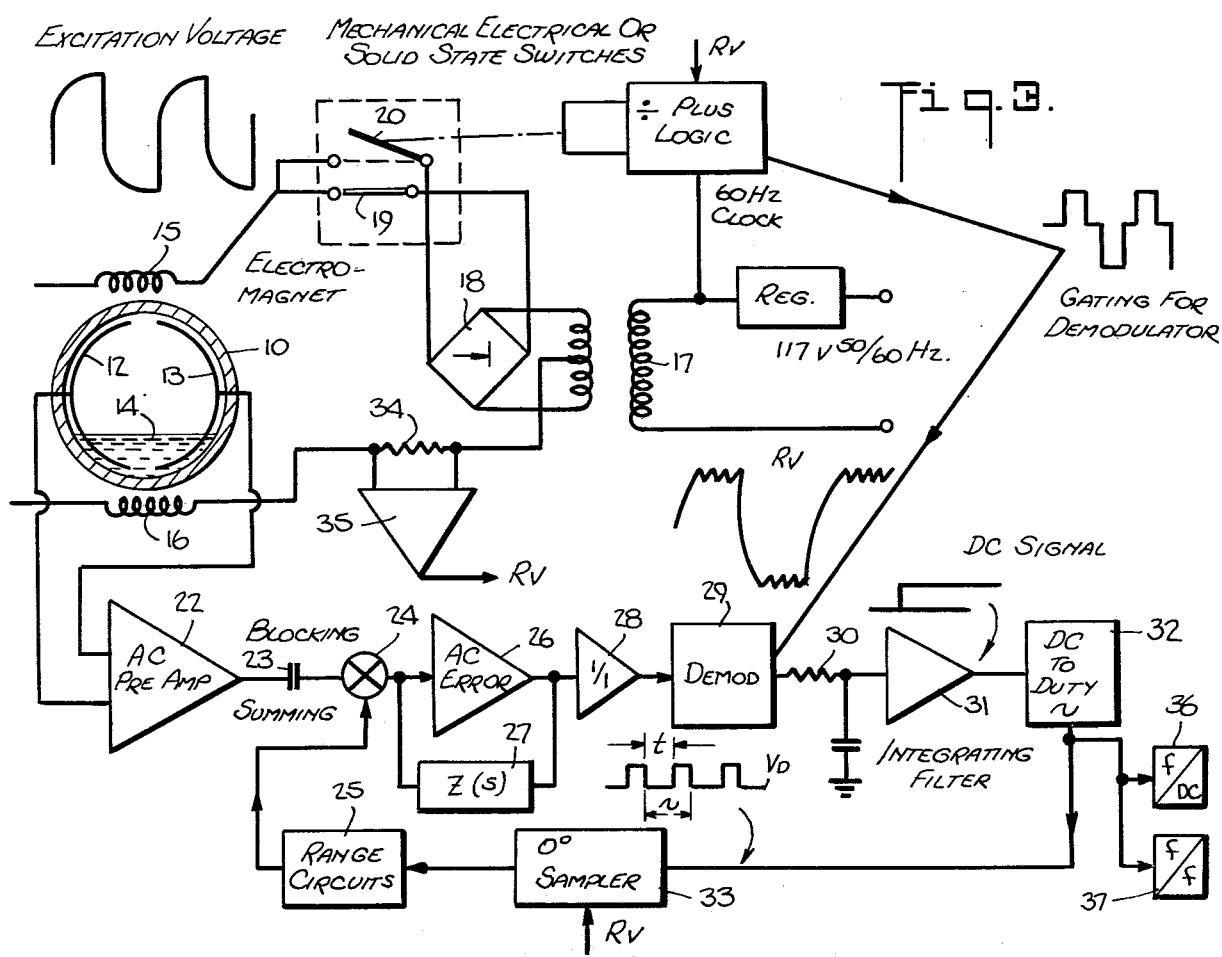

4,036,052

ELECTROMAGNETIC FLOWMETER USABLE IN LESS-THAN-FULL FLUID LINES

RELATED APPLICATION

This application is related to the pending patent application Ser. No. 622,063, filed Oct. 14, 1975 (now U.S. Pat. No. 3,991,612) of Mannherz et al. (common assignee), the entire disclosure of which is incorporated herein by reference.

BACKGROUND OF INVENTION

This invention relates generally to electromagnetic flowmeters for measuring the flow rate of fluids passing through a pipe line, and more particularly to a flowmeter whose electrode structure is adapted to provide accurate flow measurement in open channels as well as in pipe lines which normally run at less than full capacity.

In an electromagnetic flowmeter, the liquid whose flow rate is to be measured is conducted through a flow tube provided with a pair of diametrically opposed electrodes, a magnetic field normal to the direction of flow being established by an electromagnet. When the flowing liquid intersects this field, a signal is induced therein which is transferred to the electrodes. This signal, which is proportional to the average velocity of the liquid and hence to its average volumetric rate, is then amplified and processed to actuate a recorder or indicator.

Electromagnetic flowmeters of the type heretofore known, including those disclosed in U.S. Pat. Nos. 3,550,446; 3,329,018 and 3,786,687, are effectively restricted to pipe lines which run full. Indeed, the instruction books which accompany such flowmeters usually admonish the user that major inaccuracies would be experienced should the flow tube be interposed in a pipe line that is less than full.

Because of this limitation, existing types of electromagnetic flowmeters are not applicable for measurement in storm sewers, plant effluent lies and in other open-channel and pipe line situations in which less-than-full pipes are normally encountered. The exclusion of electromagnetic flowmeters from such applications is a serious drawback when one takes into account the many advantages to be gained by an electromagnetic flowmeter which is free of moving parts and which introduces no obstacle in the flow path.

There are at least four reasons why known types of electromagnetic flowmeters are incapable of providing accurate measurement with less-than-full pipes, and these will now be briefly considered.

POINT I

A standard, full pipe electromagnetic flowmeter in which an electromagnetic field is established by means of sinusoidal a-c power exhibits large zero shifts as the pipe becomes partially full. This is caused by variations in the geometry of the pick-up loop formed by the electrode leads and the fluid-conducting path therebetween.

POINT II

A standard, full-pipe electromagnetic flowmeter makes use of a pair of button-shaped electrodes mounted at diametrically opposed positions in a horizontal plane passing through the center of the meter tube, this plane defining the half-full level. When, therefore, the fluid in the flow tube falls below the half-full level, the electrodes lose contact with the fluid and the meter is unresponsive to fluid flow.

POINT III

In the standard meter, the magnetic field established therein has a flux distribution in which the flux intensity is symmetrical from the top to the bottom of the flow tube. With this magnetic field, the signal-to-flow rate ratio increases as the level of the fluid in the meter drops, whereas for accurate measurement it is vital that the signal be independent of fluid level.

POINT IV

In a conventional flowmeter in which the electrodes are exposed and in electrical contact with the fluid passing through the flow tube, it has been found that as soon as any portion of the electrodes becomes uncovered as the fluid level drops, large d-c potential variations are encountered. These variations are often of greater amplitude than that of the flow-induced signal, giving rise to erroneous indications of flow rate.

To provide a flowmeter which is effective in measuring flow rate in less-than-full pipes, the above-identified Mannherz et al. copending application discloses an arrangement wherein mounted within the flow tube interposed in the fluid line at opposed positions therein is a pair of arcuate electrodes spanning a considerable portion of the total tube circumference to render the electrodes operative with respect to the fluid passing through the tube in a range extending from a level approaching the empty state to a level approaching the full state.

In Mannherz et al., the electrodes are embedded in a dielectric liner and are therefore not in contact with the fluid being metered as in a conventional magnetic flowmeter but are electrically insulated therefrom, thereby dictating the use of a high impedance amplifier for the signal derived from these electrodes.

Associated with the flow tube in the Mannherz et al. meter is an electromagnet whose coils are excited by a periodically interrupted direct current to establish a magnetic field that is intercepted by fluid passing through the tube to induce a signal in the electrodes. This signal is sampled during the steady state intervals of the magnetic flux to provide an output free of zero shift error and of interference voltages. The distibution of magnetic flux in the field is made such as to progressively decrease in intensity as one goes from the top to bottom of the tube, thereby providing an output signal which is indicative of flow rate and independent of flow level.

SUMMARY OF INVENTION

The main object of the present invention is to provide a flowmeter capable of accurately measuring flow rate when interposed in a line passing fluid through the flow tube at a level below its full capacity, which flowmeter makes use of electrodes which are in direct contact with the fluid but are so shaped as to obviate the drawbacks that normally attend the use of direct-contact electrodes.

More particularly, in the electrode arrangement disclosed in the Mannherz et al. application, the electrodes are insulated from the fluid being metered but are capacitively coupled thereto to obviate the generation of galvanic potentials, whereas in the present invention, the electrodes are so shaped as to reduce the noise level to a degree which renders unnecessary the use of insulated electrodes as well as a high-impedance input amplifier and other expedients dictated by capacitively coupled electrodes.

A significant advantage of a flowmeter in accordance with the invention which includes shaped electrodes in direct contact with the fluid is that it is less expensive than a meter of the Mannherz et al. type, for it permits the use of a conventional primary structure designed for standard electrodes, the shaped electrodes being secured to the bosses normally provided for the standard electrodes.

Also an object of this invention is to provide a flowmeter of the above-type in which the electrodes in direct contact with the fluid are shaped to span a substantial portion of the total circumference of the flow tube so that the electrodes are fully operative with respect to fluid passing through the tube even when the fluid level is very low, the shape being such as to minimize variations in DC potential.

Briefly stated, these objects are accomplished in a flowmeter having a flow tube which is interposable in a fluid line, such as a sewer pipe, that is normally less-than-full. Mounted within the flow tube at opposed positions therein in direct contact with the fluid is a pair of arcuate electrodes spanning a considerable portion of the total tube circumference to render the electrodes operative with respect to the fluid passing through the tube in a range extending from a level approaching the empty state to a level approaching the full state. Each electrode has an inverted T-formation whose vertical leg conforms to the inner circumference of the tube and whose horizontal base extends along the bottom of the tube, thereby maintaining a large portion of the total area of the electrode in contact with the fluid at all times.

Associated with the tube is an electromagnet whose coils are excited by a periodically-interrupted direct current to establish a magnetic field that is intercepted by fluid passing through the tube to induce a signal in the electrodes. This signal is sampled during the steady state intervals of the magnetic flux to provide an output free of zero shift error and of interference voltages. The distribution of magnetic flux in the field is made such as to progressively decrease in intensity as one goes from the top to bottom of the tube, thereby providing an output signal which is indicative of flow rate and independent of flow level.

OUTLINE OF DRAWING

For a better understanding of the invention as well as other objects and further features thereof, reference is made to the following detailed description to be read in conjunction with the accompanying drawings, wherein:

FIG. 1 is a transverse section taken through the flow tube of an electromagnetic flowmeter system in accordance with the invention;

FIG. 2 illustrates, in perspective, one of the electrodes mounted within the tube; and FIG. 3 is a schematic diagram of the flowmeter system.

DESCRIPTION OF INVENTION

METER PRIMARY

Referring now to FIG. 1, there is shown in section a flow tube 10 which is included in a flow measuring system in accordance with the invention. Tube 10, when fabricated of conductive material, is provided with an inner insulating liner 11. Mounted on the surface of liner 11 in direct contact with the fluid passing through the tube is a pair of arcuate electrodes 12 and 13 which occupy opposed positions in the tube and together span a considerable portion of the total circumference thereof. In practice, each electrode spans about 170°.

The horizontal plane X passing through the center of tube 10 represents the level of the fluid when it is half full. It will be evident from FIG. 1 that the actual level of fluid 14 is well below the half-way point. It will also be evident that electrodes 12 and 13 will remain in operative relation with this fluid even when the level is close to empty. In practice, therefore, the level would have to drop below a level of about 0.01 D before effective contact is lost with the electrodes. Since a flow rate creating a level this low would be almost negligible, the fact that it cannot be measured is immaterial in practical terms.

Associated with flow tube 10 is an electromagnet having coils 15 and 16 which in practice may be saddle-shaped. The coils are placed on the top and bottom of the tube to establish a magnetic field therein whose lines of flux are perpendicular to the direction of fluid flow, whereby when the fluid passes through the flow tube, a signal is induced in the electrodes as a function of flow rate.

In order, therefore, to render the output signal independent of the fluid level, the flux density of the magnetic field established by coils 15 and 16 is set up so that this density decreases progressively as one goes from the top of the meter tube to the bottom thereof. As explained in detail in the copending Mannherz application, the flow signal induced in the electrodes is the resultant of an infinite number of generators dispersed in the fluid. The circuit surrounding the generator may be represented by a network of fluid-equivalent shunting resistors. The decrease in density causes the generator output to decrease as one moves from the top to the bottom of the tube to an extent compensating for the loss of the fluid-equivalent shunting resistors as the fluid level drops.

This progressive decrease in flux density may be effected by adjusting the relative amount and the direction of excitation current applied to coils 15 and 16, or by providing a larger coil at the top section of the meter tube than at the bottom thereof.

THE ELECTRODES

As pointed out previously, in a situation in which the electrodes of conventional design are in direct electrical contact with the fluid and are partially uncovered as the fluid level drops, large d-c potential variations take place. These variations are at a frequency close to the frequency of the flow-induced signal and are often of much greater amplitude than the flow-induced signal. Hence they result in large output indication variations. Moreover, the d-c potential variations act, most of the time, to saturate the signal converter coupled to the electrodes, giving rise to errors because of operation in the saturated condition. The objectionable d-c potentials are due to the galvanic potentials that exist between the electrodes and ground.

Whenever two metals (electrodes) are immersed in an electrolytic solution, a potential difference will exist between them. These potentials are described by the Nerst equation:

$$E - E_o = \frac{RT}{nF} \ln a+$$

where:
- $E_o$ is the potential that would exist if the reaction products were at equilibrium conditions, V
- $E$ is the potential existing under non-equilibrium conditions, V
- $T$ is the absolute temperature, K
- $n$ is the number of gram-atoms/gram-mole
- $a+$ is the activity quotient established by concentrations of the reaction products at the electrodes
- $R$ is the gas constant $= 8.314$ J/K. mol
- $F$ is the Faraday constant $- 96,500$ coulombs/gram-atoms At equilibrium $a+ = 1$ so that $\ln a+ = 0$ and $E - E_o = 0$. Any dynamic condition producing non-equilibrium concentrations of reaction products at the electrodes causes $a+ \neq 0$ and, therefore, $E - E_o \neq 0$. In the case of the partially full magnetic flowmeter, it is this $E - E_o$ voltage which appears as noise on the flow signal. A fuller discussion of the behavior of metals immersed in an electrolyte may be found in *Outlines of Physical Chemistry*, Daniels, F., Wiley 1950, Chapter XVI.

Through the area of the electrodes does not directly enter into the Nerst equation, rapid changes in the area will, in a dynamic situation, influence the value of the activity coefficient $a+$. Thus, during non-equilibrium conditions, the potential difference of the electrodes ($E$) will be a function of the change in area that is immersed in the electrolyte.

$$\Delta E = f(\Delta A)$$

In a partially full electromagnetic flowmeter with arcuate electrodes, the condition exists that the area of the electrode exposed to the electrolyte is continually changing. This is typical of any open channel turbulent flow. Thus the $\Delta E$ observed at the electrodes will be a function of both the turbulence of the flow and the geometric configuration of the electrodes which will determine the $\Delta A$ for a given flow condition.

It becomes important, therefore, to configure electrodes 12 and 13 so as to minimize rapid changes in the electrode area that makes contact with the fluid. FIG. 2 illustrates in connection with electrode 13 a preferred electrode configuration which is adapted to maintain a large portion of the total area of the electrode in contact with the fluid electrolyte at all times regardless of changes in fluid level.

The shaped electrode 13 has an inverted T-formation constituted by a vertical leg 13A which is curved to conform to the inner circumference of the flow tube and a horizontal straight-line base or strip 13B which extends along the bottom of the flow tube. Base 13B represents a substantial portion of the total area of the electrode and is always in contact with the fluid regardless of the level of the fluid in the flow tube, whereas the area of vertical leg 13A representing the remaining portion of the total area of the electrode is more or less in contact with the fluid, depending on fluid level. Thus the percentage change in the total electrode due to rapid changes in the fluid level is minimized. As a consequence, changes in DC potential at the electrodes will be minimal.

It will be appreciated that the inverted T formation is not the only electrode shape that will accomplish the desired result. The geometrical requirement is such that a substantial portion of the overall area of the electrode must always stay in contact with the fluid, changes in fluid contact being restricted to the remaining portion of the electrode area. This may also be accomplished by a pear-shaped or other configuration in which most of the total area is adjacent the bottom of the tube.

The magnetic field may be either direct or alternating, for in either event the amplitude of signal induced in the liquid passing through the field will be a function of its flow rate. However, when operating with direct magnetic flux, the d-c signal current flowing through the liquid acts to polarize the electrodes, the magnitude of polarization being proportional to the time integral of the polarization current. With alternating magnetic flux operation, polarization is rendered negligible, for the resultant signal current is alternating and therefore its integral does not build up with time.

Though a-c operation is clearly advantageous in that polarization is obviated and the a-c flow-induced signal may be more easily amplified, it has distinct drawbacks. The use of an alternating flux introduces spurious voltages that are unrelated to flow rate and, if untreated, give rise to inaccurate indications. The two spurious voltages that are most troublesome are:

1. stray capacitance-coupled voltages from the coil of the electromagnet to the electrodes, and
2. induced loop voltages in the input leads. The electrodes and leads in combination with the liquid extending therebetween constitute a loop in which is induced a voltage from the changing flux of the magnetic coil.

The spurious voltages from the first source may be minimized by electrostatic shielding and by low-frequency excitation of the magnet to cause the impedance of the stray coupling capacitance to be large. But the spurious voltage from the second source is much more difficult to suppress.

The spurious voltage resulting from the flux coupling into the signal leads is usually referred to as the quadrature voltage, for it is assumed to be 90° out of phase with the A-C flow-induced voltage. Actual tests have indicated that this is not true in that a component exists in-phase with the flow-induced voltage. Hence, that portion of the "quadrature voltage" that is in-phase with the flow-induced voltage signal constitutes an undesirable signal that cannot readily be distinguished from the flow-induced signal and whose change produces a changing zero shift effect.

Existing a-c operated electromagnetic flowmeters are also known to vary their calibration as a function of temperature, fluid conductivity, pressure and other effects which can alter the spurious voltages both with respect to phase and magnitude. Hence, it becomes necessary periodically to manually re-zero the meter to correct for the effects on zero by the above-described phenomena.

All of the adverse effects encountered in a-c operation of electromagnetic flowmeters can be attributed to the rate of change of the flux field ($d\phi/dt$), serving to induce unwanted signals in the pick-up loop. If, therefore, the rate of change of the flux field could be reduced to zero value, then the magnitude of quadrature voltage and of its in-phase component would become non-existent and zero drift effects would disappear. When the magnetic flux field is a steady state field, as, for example, with continuous d-c operation, the ideal condition $d\phi/dt=0$ is satisfied.

But d-c operation to create a steady state field is not acceptable, for galvanic potentials are produced and polarization is encountered. In a system in accordance with the invention for measuring flow in less-than-full pipes, the coils of the electromagnet periodically interrupt d-c power and the signal is sampled during intervals in which a steady-state condition exists so that one retains the advantages of a-c operation without its concomitant disadvantages.

THE SYSTEM

Referring now to FIG. 3, there is shown a flowmeter system in accordance with the invention, constituted by a primary in the form of an electromagnetic flowmeter adapted to produce a low-level, a-c signal output whose amplitude is proportional to the flow rate of the liquid being measured, and a secondary which converts this low level a-c signal to a proportional d-c current output signal.

The flowmeter primary includes the flow tube 10 through which the liquid 14 to be measured is conducted, the liquid only partially filling the tube. The electromagnet, including coils 15 and 16, establishes a magnetic field transverse to the direction of flow and which is perpendicular to the axis of the electrodes.

As is well known, a voltage is induced in liquid 14 whose flow intersects the magnetic field, this voltage being transferred to electrodes 12 and 13 to produce a signal at flowmeter output terminals that reflects the flow rate. This signal is referred to as the flow-induced signal to distinguish it from spurious signal components that are independent of flow rate.

Coils 15 and 16 are energized by a relatively low-frequency square wave derived from a full-wave rectifier power supply constituted by a transformer 17 whose primary is connected to an a-c power line through a regulator 17A, the line supplying the usual 50 or 60 Hz current. The secondary of transformer 17 is connected to the input junctions of a full-wave rectifier bridge 18, whose output junctions are connected to the respective movable contacts of two single-pole single-throw switches 19 and 20 whose fixed contacts are both connected to one end of the series-connected coils 15 and 16, the other end being connected to the center tap of the secondary of transformer 17.

When switch 19 is closed and switch 20 is simultaneously open, the rectified output is applied to the magnet coil in one polarity, and when switch 19 is open and switch 20 is simultaneously closed, the polarity is reversed. Alternatively, rather than reversing polarity, the switch may be arranged to periodically interrupt the d-c power to provide a single-sided on-off operation.

While for purposes of explanation, switches 19 and 20 are shown as mechanical devices, in practice these switches are in electronic form and may be constituted by triacs or any other type of electronic switching device in vacuum tube or solid-state form.

Switches 19 and 20 are activated at a rate which is low relative to the frequency of the a-c line. This is accomplished by means of a presettable scaler or frequency divider 21 to which the 60 Hz line voltage is applied as a clock signal, the scaler yielding low frequency pulses in the order of $1\frac{7}{8}$, $3\frac{3}{4}$ or $7\frac{1}{2}$ Hz.

The low-frequency pulses from the scaler are applied to the firing electrodes of the two triac switches (or whatever other electronic switching devices are used) to alternately turn on the triacs and thereby connect either the positive or the negative side of the full-wave rectified 60 Hz voltage to the magnet coils. Thus when switch 19 is closed, current flows through the magnet coil in one direction, and when switch 20 is closed, the current flows in the reverse direction.

Because the output of the full-wave rectifier is a raw, unfiltered direct voltage, it is composed by a continuous train of half-cycle pulses, all of the same polarity. But with the low-frequency switching action in accordance with the invention, the voltage applied to the coils is periodically reversed in polarity, as a result of which the current passing through the coil has a 120 Hz ripple component.

Because the electromagnet has a relatively high inductance, it functions as a filter choke, and, in practice, it takes out as much as 75 percent of the ripple component. The remaining portion of the 120 Hz rippel component that appears in the flow-induced signal is smoothed out at the summing junction of the secondary via the filter action of the associated error amplifier, to be later described. This obviates the need for filter capacitors associated with the choke, as in conventional filters. Thus, the system functions as it it were excited by a "square wave equivalent" having a substantially constant amplitude.

The flow-induced signal appearing across electrodes 12 and 13 of the flowmeter primary is fed to a secondary constituted by a converter. This converter is essentially a solid-state feedback system producing a frequency output (and optional current) proportional to flow.

In the converter shown in FIG. 3, the flow-induced signal is applied to the first stage of the converter which is an a-c pre-amplifier 22. This signal has a generally square-wave formation but for the spikes appearing at the points of polarity reversal. These spikes are the result of switching transients or surges, and have a duration depending on the inductance-resistance time constant of the electromagnetic circuit.

The constant level portion of the square wave reflects the steady state condition of the magnetic field, and has an amplitude that is directly proportional to the velocity of liquid passing through the flow-tube. Hence it is only this portion of the signal which is of interest for accurate measurement purposes.

The output of pre-amplifier 22 is applied through a blocking capacitor 23 to one input of a summing junction 24 to whose other input is fed the output of a range attenuation circuit 25 from an error signal type of feedback loop. The error signal produced by a comparison of the flow signal and the feedback signal in the summing junction is amplified in a-c error amplifier 26, which is provided with a negative feedback circuit 27 adapted to attenuate all frequencies lower and higher than that of the error signal.

The a-c output of the error amplifier is applied to an inverting 1:1 amplifier 28, whose output is applied to a full-wave demodulator 29. The operation of the demodulator is synchronized with the low-frequency switching rate of the magnet coil and is so gated as to block the applied error signal at those points corresponding to the point of polarity reversal, the blockage being maintained for the duration of the inductance-resistance time constant of the electromagnetic circuit. In this way, the d-c output of the demodulator reflects only the steady state magnetic flux condition, the spiked portions of the flow-induced signal being suppressed.

In order to synchronize the demodulator, the frequency divider 21, which responds to the 50 or 60 cycle signal to produce low-frequency control pulses for governing the electromagnet switching action, is provided with suitable logic to produce gating pulses at the same low-frequency rate. These gating pulses are coincident with the steady-state portion of the flow-induced signal. Thus, the demodulator is activated only during the steady state intervals and is otherwise blocked. As a consequence, the secondary only looks at the flow-induced signal during the period that $d\phi/dt$ is equal to zero.

The d-c output pulses produced by demodulator 29 are applied to a resistance-capacitance integrating circuit 30 to produce a direct-voltage error signal whose magnitude is a function of flow rate. This error signal is applied to a direct-current amplifier 31, whose output is used as a controlled bias for a d-c to frequency converter 32.

The d-c-to-frequency converter translates the d-c error signal level to a variable frequency pulse train which exhibits a duty cycle that is proportional to the error signal. (Duty cycle is defined as the pulse width or on-time interval ($t$) divided by the total period ($\tau$). This variable duty cycle error signal VD is used to drive the output circuits of the system as well as serving as the take-off point for the error signal feedback circuit.

For purposes of feedback, the variable duty cycle error signal must first be restored to a proportional low-frequency signal (i.e., 1⅞ Hz or whatever low frequency is in effect). This is accomplished by means of a sampling circuit 33 coupled to the dc-to-duty cycle converter 32 and acting to sample an in-phase reference voltage RV derived from the electromagnetic circuit.

To generate this reference voltage, a fractional-ohm resistor 34 is interposed between the series-connected coils and the center tap of the secondary of transformer 17, the voltage drop thereacross depending on current flow through the magnet coil. This voltage is applied to an operational amplifier 35 to produce reference voltage RV at its proper level.

The output of sampler 33 is constituted by the duty-cycle pulses derived from the d-c to frequency converter, enveloped by the low-frequency square wave reference voltage RV. This output is fed to summing junction 24 through the range attenuator 25. Inasmuch as this feedback signal depends on the amplitude of reference voltage RV, any variation in the voltage as a result of line fluctuations will proportionately change the feedback signal. Since it is the ratio of the flow-induced signal to the feedback signal that constitutes the measurement criterion, no loss of accuracy will be experienced with variations in line voltage (within reasonable limits).

The signal from the dc-to-duty cycle converter 32 is applied to a duty-cycle-to-dc converter 36, which converts the pulses of the former into an analog d-c output that is proportional to fluid flow rate. The signal from the dc-to-duty cycle converter is also applied to a pulse scaler 37 which converts the applied pulses into engineering units which are available to drive an external counter.

While there has been shown and described a preferred embodiment of an electromagnetic flowmeter in accordance with the invention usable in less-than-full fluid lines, it will be appreciated that many changes and modifications may be made therein without, however, departing from the essential spirit thereof.

We claim:

1. An electromagnetic flowmeter for accurately measuring the flow rate of fluid in a fluid line which is normally less-than-full, said flowmeter comprising:
    A. a flow tube interposable in said line and provided with a pair of arcuate electrodes in direct contact with said fluid and spanning a substantial portion of the total circumference of the tube to render the electrodes operative with respect to the fluid passing through the tube in a fluid level range whose lowest point is a level close to empty, each electrode having a shape whose total area includes a substantial portion which is disposed adjacent to the bottom of the tube and is therefore always in contact with the fluid passing therethrough regardless of fluid level, whereby the percentage change in the total electrode area due to changes in fluid level are minimized; and
    B. electromagnetic means to establish a magnetic field in said tube which is intercepted by said fluid to induce a signal in said electrodes.

2. A flowmeter as set forth in claim 1, wherein said electromagnetic means establishes a magnetic field in said tube having an intensity which is greatest at the top of said tube and diminishes as one approaches the bottom thereof to an extent rendering the amplitude of said signal proportional to volumetric flow rate and substantially independent of the level of fluid in said flow tube.

3. A flowmeter as set forth in claim 1, wherein said electrodes each have an inverted T-formation whose vertical leg conforms to the inner circumference of the tube and whose horizontal base extends along the bottom of the tube.

4. A flowmeter as set forth in claim 3, wherein each of said electrode legs spans a circumference of about 170° whereby said fluid level range extends from a level close to empty to a level close to full.

5. A flowmeter as set forth in claim 1, wherein said electrodes are mounted on an insulating liner disposed within said flow tube.

6. A flowmeter as set forth in claim 1, wherein said means to establish a magnetic field is constituted by a source of d-c power which is periodically interrupted.

7. A flowmeter as set forth in claim 6, wherein said electrodes yield a signal which depends on flow rate, and further including means to sample said signal during intervals in which a steady state condition exists.

* * * * *

UNITED STATES PATENT OFFICE
CERTIFICATE OF CORRECTION

Patent No. 4,036,052　　　　　　　　Dated July 19, 1977

Inventor(s) John L. Searle

It is certified that error appears in the above-identified patent and that said Letters Patent are hereby corrected as shown below:

Column 1, line 41 "lies" should have read -- lines --

Column 2, line 46 "distibution" should have read -- distribution --

Column 5, line 26 "Through" should have read -- Though --

Column 8, line 18 "rippel" should have read -- ripple --

Signed and Sealed this

Twenty-fifth Day of October 1977

[SEAL]

Attest:

RUTH C. MASON　　　　　　LUTRELLE F. PARKER
*Attesting Officer*　　　*Acting Commissioner of Patents and Trademarks*